No. 723,931. PATENTED MAR. 31, 1903.
T. M. SHORT.
COTTON CHOPPER.
APPLICATION FILED DEC. 23, 1902.
NO MODEL.

Witnesses
C. H. Walker.
M. A. Schmidt

Inventor
T. Massey Short.
By Milo B. Stevens & Co.
Attorneys

UNITED STATES PATENT OFFICE.

THOMAS MASSEY SHORT, OF NEW LEWISVILLE, ARKANSAS.

COTTON-CHOPPER.

SPECIFICATION forming part of Letters Patent No. 723,931, dated March 31, 1903.

Application filed December 23, 1902. Serial No. 136,311. (No model.)

*To all whom it may concern:*

Be it known that I, THOMAS MASSEY SHORT, a citizen of the United States, residing at New Lewisville, in the county of Lafayette and State of Arkansas, have invented certain new and useful Improvements in Cotton-Choppers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a cotton-chopper attachment for cultivators, and has for its object a simple and efficient attachment of this kind which may be adjusted vertically to chop at varying depths.

A further object is to provide a chopper so constructed that the distance between the "stands" may be varied.

My invention is shown in the accompanying drawings, in which—

Figure 1:
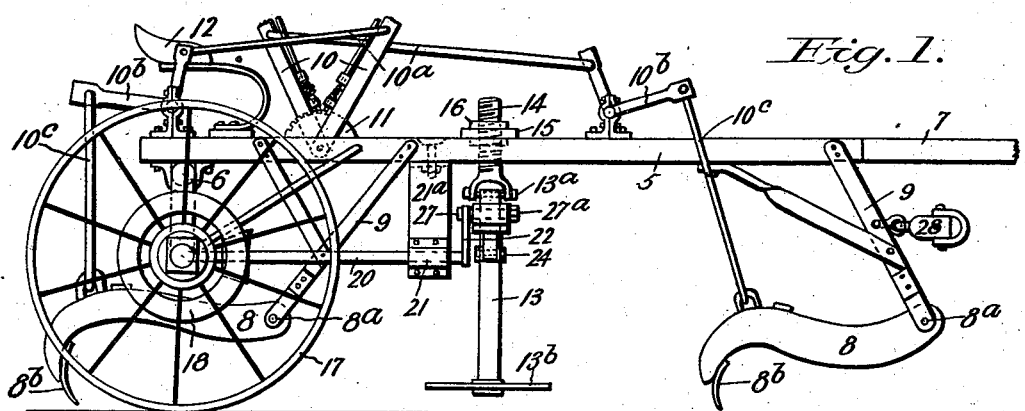
Figure 2:
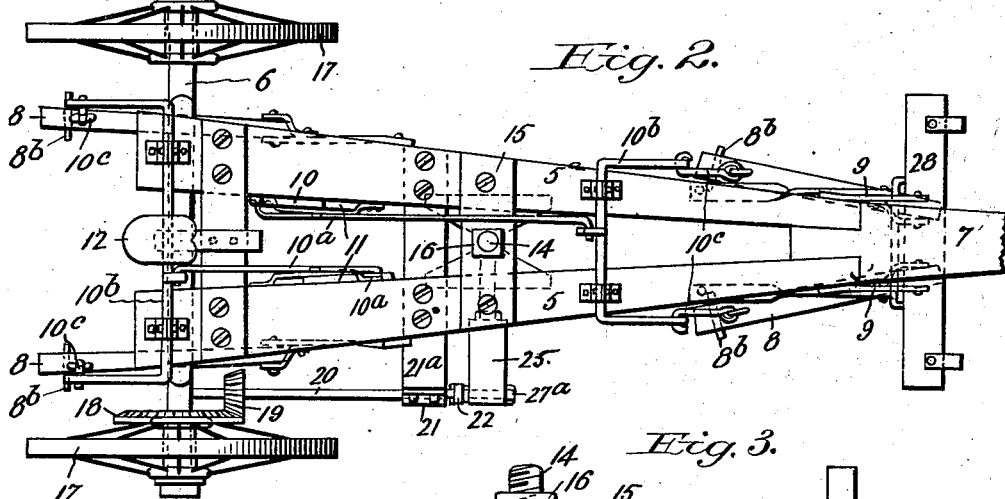
Figure 3:
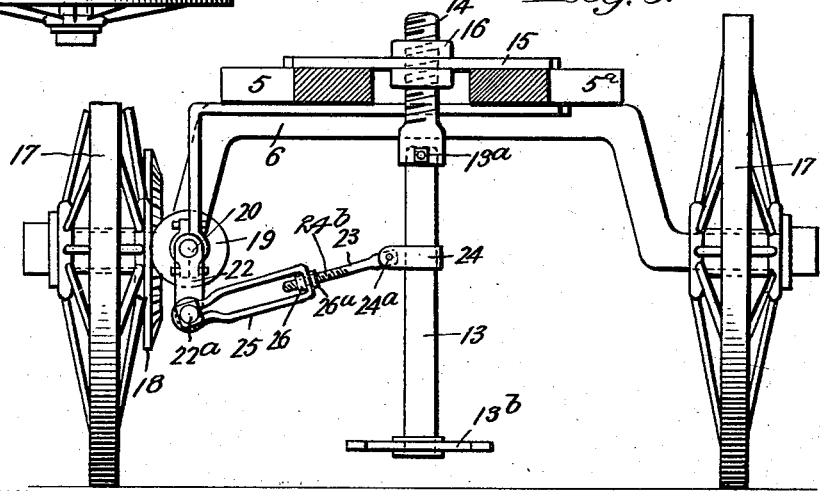

Figure 1 is a side elevation, and Fig. 2 a top plan view. Fig. 3 is a detail view, in front elevation, of the pitman and adjoining parts by which the chopper is operated.

Referring specifically to the drawings, 5 and $5^a$ indicate two beams which comprise the main frame of my machine. They are supported at the rear end on the arched axle 6. The main frame has a tongue 7 extending outwardly from its front end.

The numeral 8 designates cultivator-beams, pivoted near their front ends, as at $8^a$, to brackets 9, secured to the main frame. Cultivator shovels or scrapers $8^b$, which may be of any preferred type, are secured to the beams 8. These cultivators are arranged in pairs near the front and rear ends, respectively, of the main frame.

The cultivators are raised or lowered by hand-levers 10, connected to the cultivator-beams by rods $10^a$, crank-shafts $10^b$, and links $10^c$. The hand-levers have the usual spring-latches engaging toothed segments 11. One hand-lever and its accessory parts are provided for each pair of cultivators, and the levers are placed near the driver's seat 12, so as to be within easy reach.

The cotton-chopper comprises a shank 13, the upper end of which is hinged, as at $13^a$, to a stem 14 to swing sidewise, and to the lower end of the shank the chopper-blades $13^b$ are secured. The upper end of the stem 14 is threaded and passes through a hole in a cross-beam 15 on the main frame. By unscrewing the nut 16 and raising or lowering the stem the depth to which the blades cut is varied.

The chopper is oscillated by the following mechanism: To one of the wheels 17, preferably to the spokes thereof, a relatively large bevel-gear 18 is secured, which meshes with a pinion 19, fixed to the shaft 20. This shaft is supported in suitable bearings 21, formed on a bracket $21^a$, secured to the main frame, one end of the shaft being journaled in the axle 6. The other end of the shaft has a crank 22, connected by a pitman 23 to the chopper-shank 13. The construction of the pitman is such that it may be lengthened or shortened, permitting variations in the stroke, of the chopper—viz., a sleeve 24 is secured to the chopper-shank 13 and the pitman is hinged thereto, as at $24^a$. The other end of the pitman is threaded, as at $24^b$, and screws into a link 25, secured to the crank-pin $22^a$. The link has an opening into which the pitman passes and is held between nuts 26 and $26^a$. The crank-pin screws into the crank, being threaded for that purpose, and is held by nuts 27 and $27^a$. By removing the nuts and crank-pin the link 25 may be turned and screwed up on the pitman, shortening the same. By shortening the pitman sufficiently the stroke of the chopper will be such that it will chop on one side of a row of plants only—that is, its throw will be so shortened that the chopper will not swing on the outthrow much, if any, beyond the vertical, so that it will not take the row on the back stroke, but will cut one way only. By lengthening the pitman the chopper will swing to both sides of the vertical and cut the row of plants both ways. The distance between the stands may thus be varied as desired.

A whiffletree 28 is secured to the front bracket 9, and attached thereto are the singletrees, to which the draft-animals are secured.

Having thus described my invention, what is claimed as new, and desired to be secured by Letters Patent, is—

1. The combination with a wheeled frame, of a cotton-chopper, comprising a vertically-adjustable shank hinged to the frame, chopper-blades secured thereto, and means for oscillating the same comprising a wheel-driven crank-shaft, a link connected thereto, and a pitman adjustably secured to the link and hinged to the chopper-shank, substantially as described.

2. The combination with a wheeled frame, of a cotton-chopper comprising a shank hinged to the frame, chopper-blades secured thereto, means for oscillating the same comprising a wheel-driven crank-shaft, a pitman secured thereto and hinged to the chopper-shank below the pivot-point of the same, and means for lengthening and shortening the pitman, substantially as described.

In testimony whereof I affix my signature in presence of two witnesses.

T. MASSEY SHORT.

Witnesses:
TILMAN B. PARKS,
C. T. SHORT.